United States Patent [19]
Bertero et al.

[11] Patent Number: 5,660,930
[45] Date of Patent: Aug. 26, 1997

[54] MULTILAYERED THIN FILMS FOR PERPENDICULAR MAGNETIC RECORDING

[75] Inventors: Gerardo A. Bertero, Stanford; Robert Sinclair, Palo Alto, both of Calif.

[73] Assignee: The Board of Trustees of the Leland Stanford Junior University, Stanford, Calif.

[21] Appl. No.: 222,675

[22] Filed: Apr. 4, 1994

[51] Int. Cl.$^6$ ............................. G11B 5/66; B32B 5/16
[52] U.S. Cl. ........................ 428/332; 428/333; 428/336; 428/668; 428/669; 428/670; 428/672; 428/673; 428/678; 428/679; 428/680; 428/694 ML; 428/694 MT; 428/694 MM; 428/694 T; 428/694 TS; 428/694 TM; 428/900
[58] Field of Search ..................... 428/668, 669, 428/670, 672, 673, 678, 679, 680, 694 T, 694 TS, 694 TM, 900, 332, 333, 336, 694 MM, 694 MT, 694 ML

[56] References Cited

U.S. PATENT DOCUMENTS 4,610,935  9/1986  Kumasaka ................. 428/632

OTHER PUBLICATIONS

M. Sokumi and T. Shinjo, "Magnetic and magneto-optical properties of Pd/Au/Pd/Co and Pd/Cu/Pd/Co multilayers", J.MMM 128/1993, pp. 237–246.

P.J.H. Bloemen and W.J.M. de Jonge, "Magnetic anisotropy of Co/Ni/Co/Pt multilayers", JMMM 116 /1992, pp. L1–L6.

*Primary Examiner*—Leszek Kiliman
*Attorney, Agent, or Firm*—Leo V. Novakoski; Edward J. Radlo

[57] ABSTRACT

A [(Pt/Co/Pt)/Pd] multilayer thin film (40) provides improved perpendicular anisotropy and magnetic coercivity relative to Pt/Co multilayer thin films (10) without reducing the Kerr rotations provided by the component Pt/Co layers (44, 48, 46). [(Pt/Co/Pt)/Pd] multilayer thin films (40) comprise a substrate (26), an optional underlayer (110) including a crystallographically textured layer (114) of Pt and a crystallographically textured layer (116) of Pd, and several quadlayers (42) of Pt, Co, and Pd forming a periodic array (43) in the direction of the normal to the substrate (26). Each quadlayer (42) of the periodic array (43) typically comprises a first layer (44) of Pt atoms approximately one to two atomic monolayers thick, a layer (46) of Co between one and three atomic monolayers thick, a second layer (48) of Pt of substantially the same thickness as the first layer (44) of Pt, and a layer (50) of Pd that is at least as thick as the Pt layers.

22 Claims, 15 Drawing Sheets $(3.2 \text{Å Co}, 12.5 \text{Å Cu})_{12}$

Co/Cu $K\perp = 1.7 \times 10^6$ erg/cc(Co)

KERR ROTATION (DEGREES) 0.5°

−20 kOe            20 kOe

APPLIED FIELD

FIG.5E $(2.3 \text{Å Pt}, 3.2 \text{Å Co}, 2.3 \text{Å Pt}, 8.4 \text{Å Cu})_{12}$ (Pt/Co/Pt)/Cu $K\perp = 1.0 \times 10^7$ erg/cc(Co)

KERR ROTATION (DEGREES) 0.5°

−20 kOe            20 kOe

APPLIED FIELD

FIG.5F

MULTILAYERED THIN FILMS FOR PERPENDICULAR MAGNETIC RECORDING

BACKGROUND OF THE INVENTION

1. Field of the Invention

This invention relates to the field of magnetic recording media, and in particular to multilayered magnetic recording media having large Kerr rotations in the blue wavelength region and improved perpendicular anisotropy and magnetic coercivities relative to those of conventional multilayer media.

2. Related Art

Magnetic recording media provide a convenient means for storing and retrieving data through the magnetization of local regions of the media in orientations to represent the ones and zeroes of binary codes. Typically, the magnetic medium is formed into a thin film and localized domains are magnetized in write operations by magnetic fields or thermomagnetic means. These localized domains can be read subsequently by measuring the polarization rotation of light scattered from the magnetic medium (Kerr rotation) or by measuring the magnetic field directly where the magnetic moment of the medium is sufficiently strong.

Much effort has been directed to enhancing the density of data storage in these magnetic media, as well as stability of stored data and the ease with which stored data can be read. For example, it is desirable to develop magnetic media having large magnetic coercivities, $H_c$, since the magnetic moments of such materials require large magnetic fields for reorientation, i.e. switching between ones and zeroes. Thus, exposure of the magnetic medium to stray magnetic fields such as those generated during magnetic write operations is less likely to corrupt data stored at adjacent locations.

The density with which data can be stored on a magnetic thin film medium for perpendicular recording is related to the perpendicular anisotropy ($K\bot$) of the material, which reflects the tendency for the magnetic moments to align in the out-of-plane direction. Thin film magnetic media having high perpendicular anisotropies have their magnetic moments aligned preferentially perpendicular to the plane of the thin film. This reduces the transition length between areas with moments of opposite orientation, allowing a larger number of magnetic bits (domains) to be packed into a unit area of the film and increasing the aerial density with which data can be stored.

A large perpendicular anisotropy is also reflected in a larger $H_c$ since the preferential out-of-plane alignment of the magnetic moments raises the energy barrier for the nucleation of a reverse magnetization domain and, similarly, makes it harder to reverse magnetic domains by rotation. Further, the magnetic remanence of a medium, which measures the tendency of the magnetic moments of the medium to remain aligned once the magnetic field is shut off following saturation, also increases with increasing $K\bot$.

The magnetic media used presently in magneto-optic thin film recording technology are usually amorphous thin film combinations of transition metals and rare earth metals (TM/RE) which have suitable Kerr rotations at red wavelengths. However, use of light having wavelengths in the red wavelength region to read TM/RF media limits the aerial density of data since the longer wavelength of red light has lower spatial resolution than, for example, blue light. Efforts are presently underway to develop Co/Pt or Co/Pd multilayer materials for perpendicular magnetic recording media since these materials have suitable Kerr rotations in the blue wavelength region. Of these materials, multilayers based on Pt/Co bilayers provide the better results since multilayers based on Co/Pd bilayers have smaller Kerr rotations than those based on Pt/Co bilayers. For example, Co/Pt multilayer films display $H_c$ on the order of 0.8 to 3 kOe, magnetic remanences of almost 100%, Kerr rotations at 400 nm of 0.25° and $K\bot$s of up to $6 \times 10^6$ erg/cc(Co) (6 Merg per cc of Co). The Kerr rotations and $K\bot$s of Co/Pd based materials are 0.18° and 10 Merg/cc (Co) for comparable films. However, these properties are a strong function of the period and thicknesses of the Co/Pt and Co/Pd layers, and the sharpness of the transition between these layers. Furthermore, the best values of these parameters are obtained only with Xe or Kr sputtering, electron beam evaporation, or molecular beam epitaxy (MBE), each of which has significant drawbacks as a large scale manufacturing method. For example, Xe and Kr are more expensive sputtering gases than Ar, and Xe is known to poison cryogenic vacuum pumps. MBE requires expensive, complex equipment and has low yields. Evaporation techniques are slow.

SUMMARY OF THE INVENTION

The present invention is a multilayered thin film (40) having enhanced perpendicular anisotropy and magnetic coercivity and having Kerr rotations comparable to those of Co/Pt multilayer thin films (10), for use as a magnetic recording medium. Furthermore, the enhanced perpendicular anisotropy and magnetic coercivity of multilayered thin films (40) in accordance with the present invention are readily produced by Ar sputtering. The enhanced perpendicular anisotropies and magnetic coercivities of these multilayered thin films (40) may be further increased by generating the multilayer thin films (40) with Xe or Kr sputtering.

Multilayer thin films (40) in accordance with the present invention comprise repeating units of a basic quadruple layer (quadlayer) structure (42), where each basic quadlayer (42) includes a first layer (44) of a first metal such as Pt or Pd, a layer (46) of a magnetic transition metal such as cobalt, a second layer (48) of the first metal, and a layer (50) of a second metal that is different from the first metal such as Pt, Pd, Ag, Cu, Rh, Ir or Ni. The basic quadlayers (42) are stacked to form a periodic array (43) along the normal (45) to a surface (27) of a substrate (26). This may be accomplished, for example, by sequentially sputtering the component materials onto the substrate (26) to produce a preselected thickness of the multilayer thin film (40). The four layer (44, 46, 48, 50) structure of the basic quadlayer (42) introduces additional anisotropy in the resulting multilayer thin film (40) relative to the corresponding magnetic metal/second metal multilayer (10) since each quadlayer (42) contains two additional interfaces (47, 49) in an area of relatively high magnetization. This additional anisotropy enhances both the perpendicular anisotropy and the magnetic coercivity of multilayer thin films (40) in accordance with the present invention. For example, when the first metal is Pt, the magnetic material is Co, and the second metal is Pd, the anisotropy and magnetic coercivity are significantly enhanced relative to Co/Pd or even Co/Pt multilayers. Furthermore, when the first metal is Pt as above, it preserves the desirable high Kerr rotation which is characteristic of Co/Pt multilayers of comparable periods, allowing the use of the second metal to tailor other properties as required for specific applications.

In a preferred embodiment of the invention, the first and second layers (44, 48) of a first metal are layers of Pt and the layer (50) of a second metal is a Pd layer. In an alternative embodiment, the roles of Pt and Pd are reversed, so that quadlayers (42) in preferred embodiments of the present invention may be represented as: [(X Pt/Y Co/X'Pt)/Z Pd] and [(X Pd/Y Co/X'Pd)/Z Pt], where X, X', Y, and Z are the thicknesses of the first layer (44) of first metal, the layer (46) of magnetic material, the second layer (48) of first metal, and the layer (50) of second metal, respectively. Thus, multilayer thin films (40) in accordance with the present invention may be represented by [(X Pt/Y Co/X'Pt)/Z Pd]$_n$ and [(X Pd/Y Co/X'Pd)/Z Pt]$_m$ where n and m represent the number of quadlayers (42) in a multilayer thin film (40). In a more preferred embodiment of the present invention, X=X' and Z>X, X'.

In another embodiment, quadlayer (42) with a one atomic monolayer of Pt as the first metal, Co as the magnetic material, and Ag as the second metal produces multilayer thin films (40) having a perpendicular anisotropy energy approximately ten times larger than the corresponding multilayer thin film (10) based on Co/Ag bilayers (12). Furthermore, the Kerr rotation is increased from approximately 0.05° to approximately 0.2°. Similarly, an approximately six-fold increase in perpendicular anisotropy has been produced utilizing quadlayers (42) wherein the first metal is Pt, the second metal is Ni, and the magnetic material is Co.

The magnetic coercivities and perpendicular anisotropies of multilayer thin films (40) in accordance with the present invention may be further enhanced without degrading the Kerr rotation by including an underlayer (110) between the substrate material (26) and the first of the quadlayers (42). The material in the underlayer (110) is selected to enhance the crystallographic texturing of the deposited quadlayers (42) and provides for greater control over the grain structure of the multilayer thin film (40). In a preferred embodiment of the invention, an underlayer (110) of thickness d comprises a first underlayer (114) of an underlayer metal of thickness t adjacent to the substrate material (26), where the underlayer metal is selected to provide a crystallographic orientation bias for aligning the quadlayers (42) in a preferred orientation with respect to the surface of the multilayer thin film (40). The underlayer (110) may also include a second underlayer (116) of a second underlayer metal of thickness (d–t) adjacent to the first underlayer (114) of the first underlayer metal. For example, in the case of [(X Pt/Y Co/X'Pt)/Z Pd] multilayer thin films (40), an underlayer (110) comprising [t Pt/(d–t)Pd] is positioned between the substrate (26) and the first of quadlayers (42) [(X Pt/Y Co/X'Pt)/Z Pd]. Underlayers (110) may also be formed using Pt, Pd, Ag, Au or any other metal capable of providing the appropriate crystallographic orientation bias.

DETAILED DESCRIPTION OF THE PREFERRED EMBODIMENTS

Figure 1:
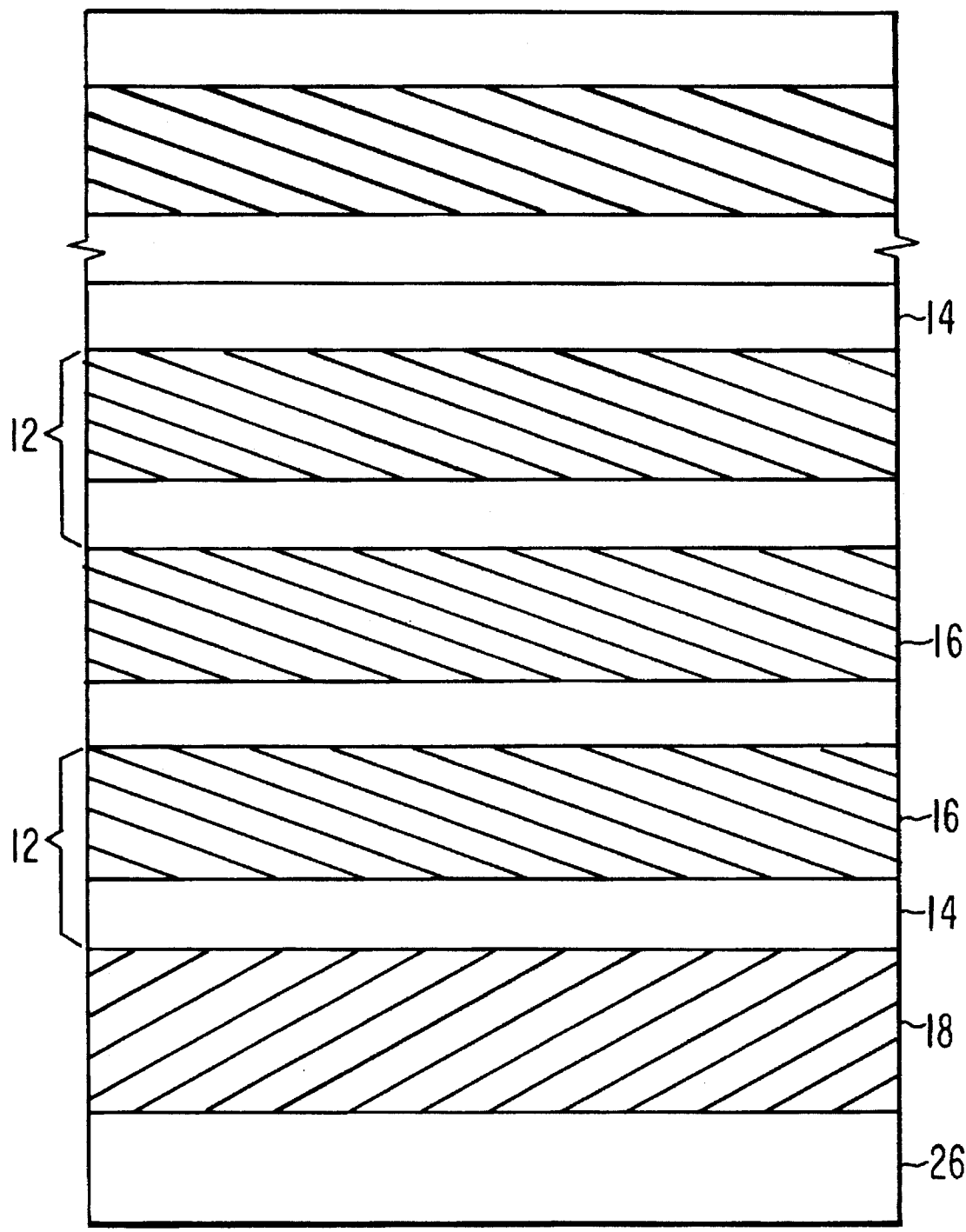
FIG. 1 is a schematic representation of a conventional multilayer thin film comprising magnetic material/second metal bilayers such as Co/Pt.

Referring to FIG. 1 there is shown a schematic representation of a conventional multilayer film 10 comprising bilayers 12 of alternating layers of a selected metal 14 and a magnetic material 16 deposited on a substrate material 26. Selected metal 14 may be, for example, Pt, Pd, Ag, Au, Rh, Ir, Cu, or Mn and magnetic material 16 may be, for example, Ni, Co, or Fe. Substrate material 26 is typically an amorphous material and it may include an additional layer 18 deposited between amorphous substrate material 18 and first bilayer 12 to bias the crystallographic orientation of bilayers 12 as they are deposited on substrate 26. The jagged line in FIG. 1 indicates that additional bilayers 12 may be present between those indicated in the Figure.

Multilayer thin film recording materials based on Pt/Co and Pd/Co bilayers 12 are strong candidates for high density thin layer magneto-optic recording media since they have Kerr rotations at 400 nm of up to 0.25° and 0.18°, respectively. Multilayer thin films 10 based on Co/Pt are thus preferred since they display higher Kerr rotations than multilayer thin films 10 based on Co/Pd. As noted above, however, multilayer thin films 10 based on Pt/Co have low perpendicular anisotropies and magnetic coercivities when produced by Ar ion sputtering. For example, the coercivities and perpendicular anisotropies of Pt/Co multilayers 10 produced by Ar sputtering are of the order of 0.6 to 1.5 kOe and 7 Merg/cc (Co), respectively. These properties may be increased to 2 to 4 kOe and 20 Merg/cc(Co), respectively, when multilayer thin film 10 is produced by Xe or Kr sputtering. Other techniques such as MBE or evaporation have cost and/or equipment requirements that limit their applicability to large scale production of Pt/Co and Pd/Co multilayer thin films.

Figure 2:
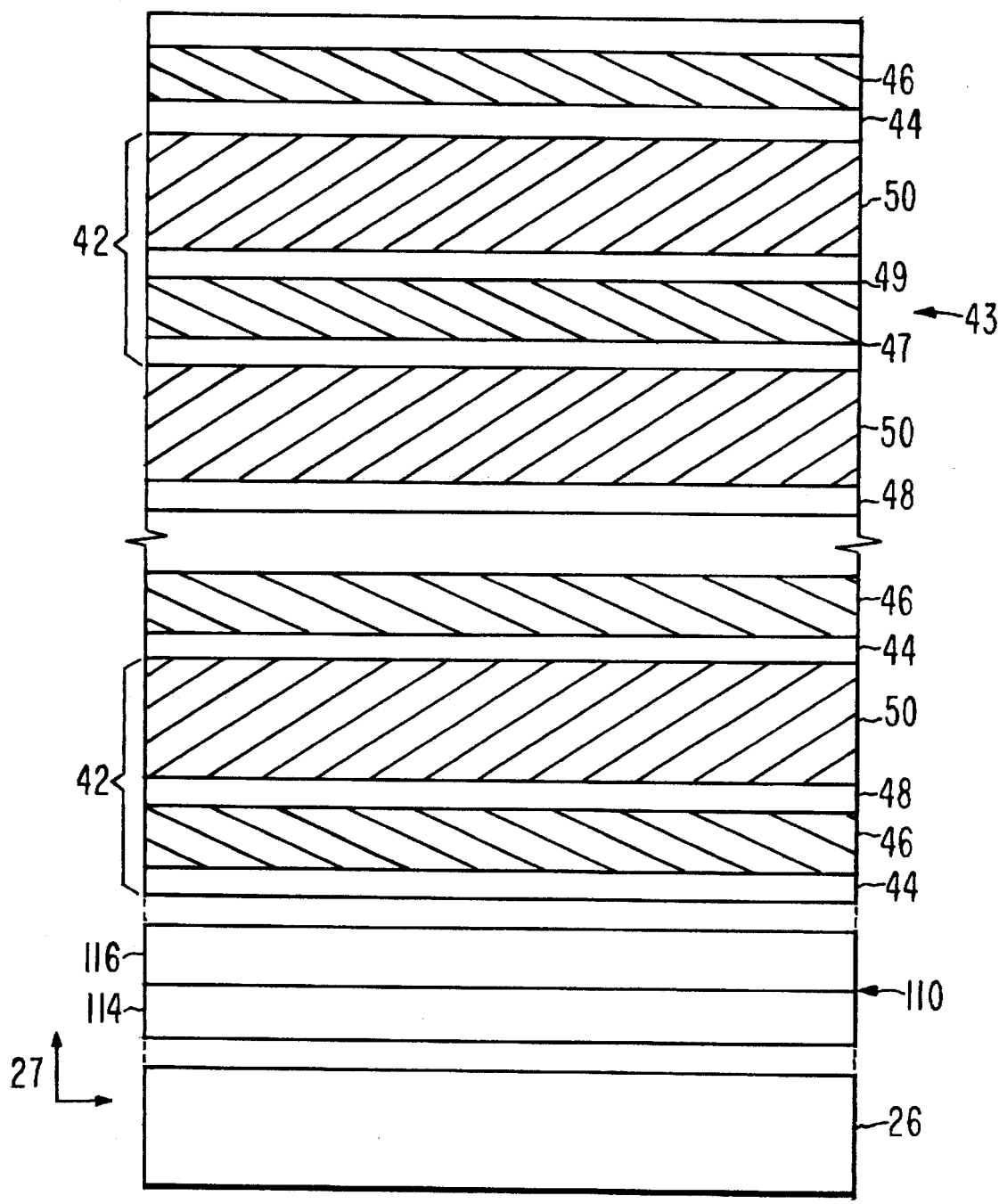
FIG. 2 is a schematic representation of a multilayer thin films in accordance with the present invention comprising first metal/magnetic material/first metal/second metal quadlayers.

Referring now to FIG. 2, there is shown a schematic representation of a multilayer thin film 40 comprising quadlayer units 42 in accordance with the present invention. Each quadlayer 42 comprises a first layer 44 of a first metal, a layer 46 of a magnetic material such as Co, Ni, or Fe, a second layer 48 of the first metal, and a layer 50 of a second metal which is different from the first metal. In one embodiment of the invention, Pt is the first metal, Pd is the second metal, and Co is the magentic material. A first quadlayer 42 is deposited on substrate 26 with subsequent quadlayers 42 serially deposited, each on top of the preceding quadlayer 42, to a preselected thickness. Also shown in FIG. 2 is an optional underlayer 110, situated between substrate 26 and first quadlayer 42, comprising component layers 114, 116. Underlayer 110 may be included to enhance the texture of quadlayers 42 by providing a crystallographic orientation bias for subsequently deposited quadlayers 42. For example, a suitable underlayer 110 for forming (111) crystallographically textured multilayer thin film 40 comprises at least one component layer 114 of material that forms (111) textured thin films on substrate 26.

For Pt, Pd, Co multilayer thin films 40, quadlayer 42 can be represented by the general formula [(X Pt/Y Co/X'Pt)/Z Pd] where X, X', Y, and Z are the thicknesses of first Pt layer 44, second Pt layer 48, Co layer 46, and Pd layer 50. However, where no thicknesses are indicated as in [(Pt/Co/Pt)/Pd], the term in square brackets represents any thickness within the scope of the present invention. Multilayer thin film 40 comprising n quadlayers 42 in accordance with the present invention is represented as [X Pt/Y Co/X'Pt/Z Pd]$_n$. In a preferred embodiment of the invention, X is approximately equal to X' and Z is approximately equal to or greater than X, X'. Typically, X and X' are selected to be between about one and about two atomic monolayers (a monolayer of Pt is approximately 2.26 Å). Y is typically about one to about five atomic monolayers (a monolayer of Co is approximately 2 Å). Typically, Z is approximately two to approximately five atomic monolayers. In a more preferred embodiment of the invention, X and X' are about one atomic monolayer, Y is about one to two atomic monolayers, and Z is about two to five atomic monolayers.

As noted above, multilayer thin films 40 may employ any magnetic material 46 in quadlayers 42. Particularly useful are those ferromagnetic materials having Curie temperatures well above room temperature, such as Co, Fe, and Ni. Similarly, other metals such as Ag, Au, Ir, Cu, Ni, Rh, and Mn that are polarizable and allow exchange coupling when in contact with ferromagnetic metals may be used in place of Pd and Pt in multilayer thin films 40. Mn may be suitable for the second metal, but not for the first metal.

Figure 3:
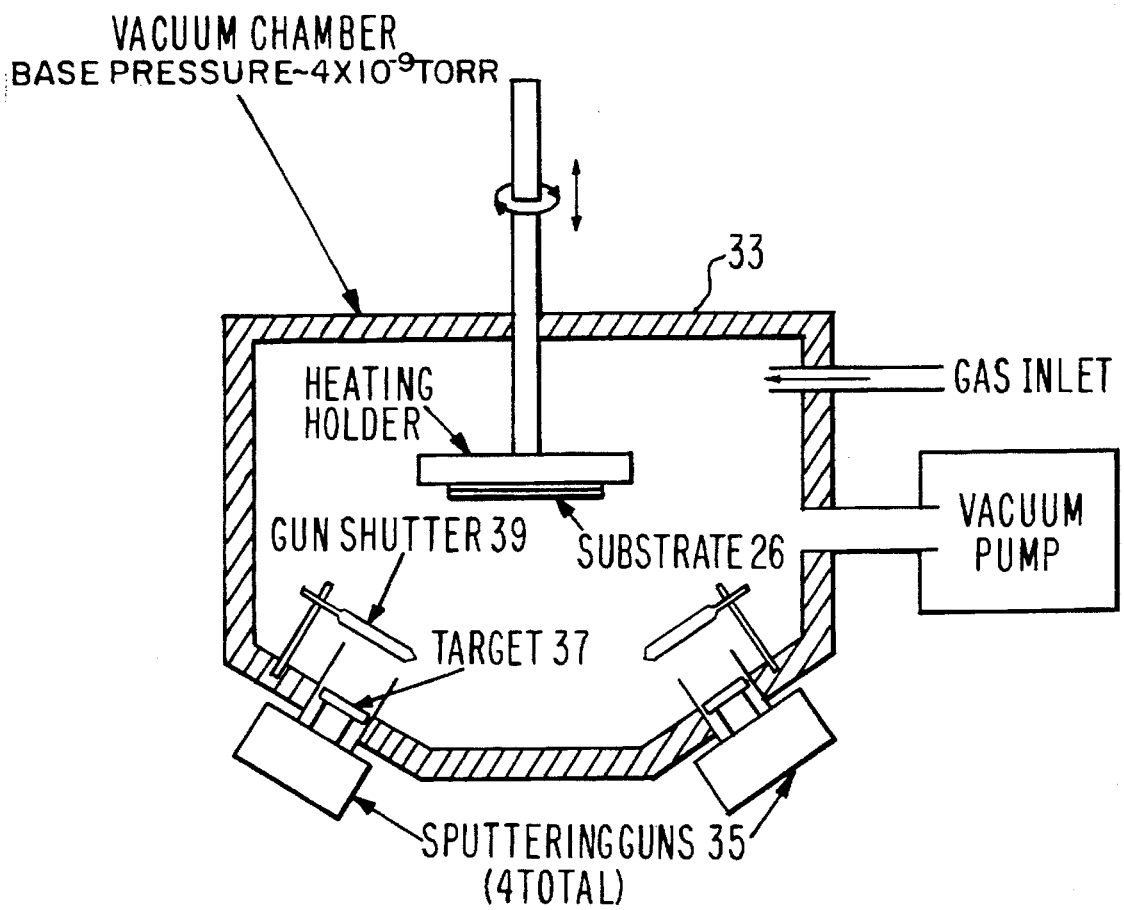
FIG. 3 is a schematic representation of a sputter deposition apparatus which may be used to produce multilayer thin films in accordance with the present invention.

Multilayer thin films 40 in accordance with the present invention may be made by a variety of deposition techniques including but not limited to sputtering with Ar, Xe, Kr or mixtures thereof, MBE, and evaporation. For example, referring to FIG. 3, there is shown a sputter deposition chamber 33 set up to produce multilayer thin films 40. Sputter deposition chamber 33 includes a sputter ion gun 35, targets 37 corresponding to the first and second metals and magnetic material 37, and a substrate material 26 oriented so that a beam of ions 31 directed from sputter ion gun 35 to one of targets 37 deposits sputtered target material 37 on substrate 26.

In a typical sputter deposition procedure, chamber 33 is evacuated to pressures below about $4 \times 10^{-9}$ torr and subsequently back-filled with a sputter gas such as Ar, Xe, or Kr. Targets 37–41 and substrate 26 may be cleaned prior to deposition by sputtering, by heating, or by a combination of heating and sputtering. Layers 42, 46, 48, 50 and underlayers 110, 112, which are discussed in detail below, are then selectively deposited on substrate 26 by means of a system of shutters 39 controlling the deposition of the appropriate target material 37. Multilayers 40 in accordance with the present invention have been made using Ar, Xe, or mixtures thereof as the sputtering gas. However, they may equally well be made by MBE, evaporation, or Kr sputter deposition processes.

Substrate 26 may be selected from a variety of materials. For example, substrate 26 for all films discussed below were Si wafers having a 2000 Å thick, thermally-grown $SiO_2$ amorphous film. Typically, underlayer films 110, 112 were deposited on substrate 26 at approximately 500° C. but may be deposited at temperatures between about room temperature and about 1000° C. Layers 44, 46, 48, 50 were typically deposited at room temperature but may be deposited at temperatures between about room temperature and about 300° C.

Figure 4A:
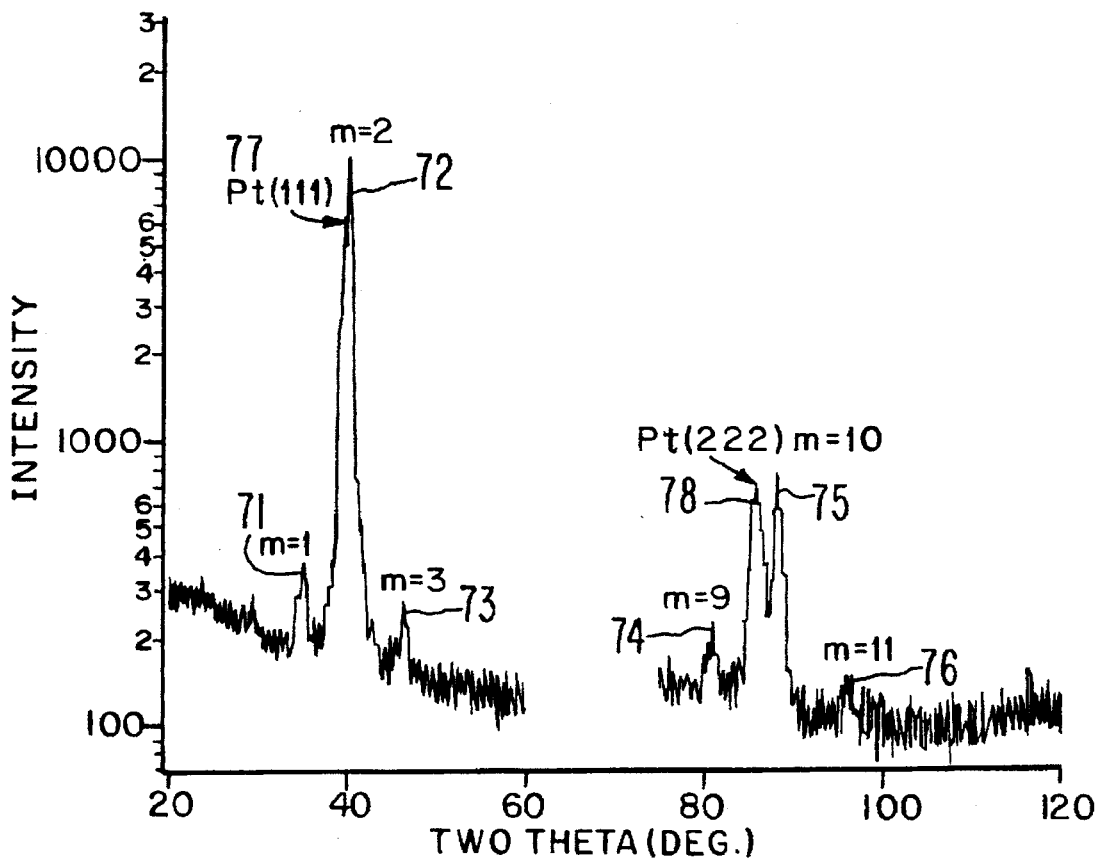
FIG. 4A is a Θ-2Θ x-ray diffraction scan of a [(Pt/Co/Pt) /Ag] multilayer thin film in accordance with the present invention.

Referring now to FIG. 4A, there is shown a $\Theta$-$2\Theta$ x-ray diffraction scan 70 of a [X Pt/Y Co/Z'Pt/Z Ag]$_n$ multilayer thin film 40 in accordance with the present invention in which X=X'=2.26 Å, Y=3.2 Å, Z=9.4 Å, and n=12. Peaks 71–76 are superlattice diffraction peaks for m=1, 2, 3, 9, 10, and 11, respectively, and indicate an overall (111) fcc multilayer texture. Also visible in diffraction scan 70 are peaks 77, 78 which correspond to (111) and (222) Pt peaks arising from a highly textured 100 Å, Pt underlayer 110 which is included to enhance the (111) texturing of multilayer thin film 40. The function of underlayer 110 is discussed below in greater detail.

Figure 4B:
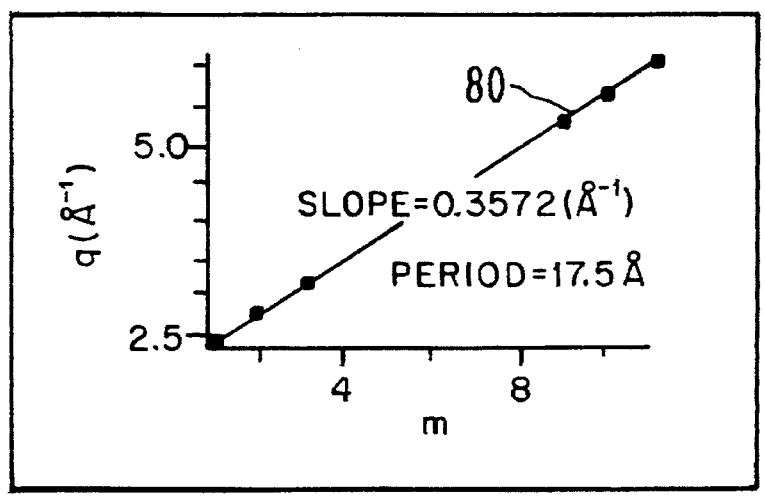
FIG. 4B is a plot of the positions of diffraction peaks in reciprocal space corresponding to the different quadlayers of a multilayer thin film in accordance with the present invention as a function of the multilayer peak order m.

Referring now to of FIG. 4B, there is shown a plot 80 of the positions of peaks 71–76 in reciprocal space against the index m of quadlayer peaks. The period derived from the slope of plot 80 is 17.5 Å, which is within 4% of the targeted period of multilayer thin film 40.

Figure 4C:
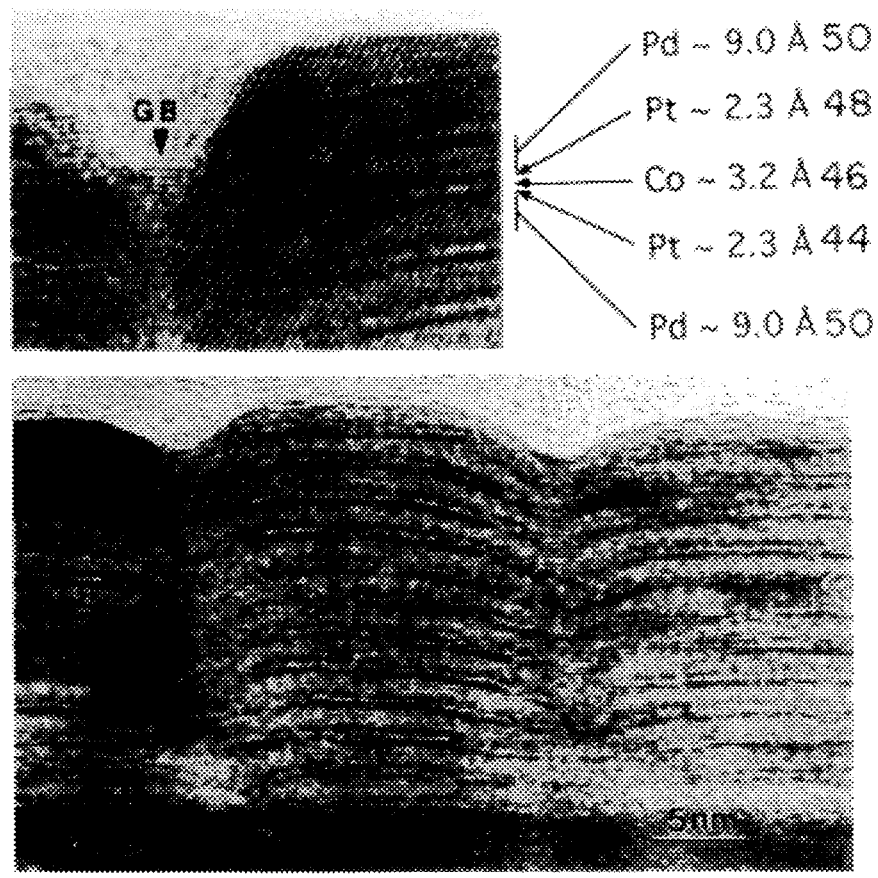
FIG. 4C is a high resolution transmission electron microscopy (HRTEM) image of a [(Pt/Co/Pt)/Pt] multilayer thin film in accordance with the present invention.

Referring now to FIG. 4C, there is shown a high resolution scanning transmission image 81 (HRSTM) of a multilayer thin film 40 in accordance with the present invention. Image 81 clearly shows a periodic structure 83 which corresponds to periodic array 43 comprising quadlayers 42 of multilayer thin films 40.

Figure 5A:
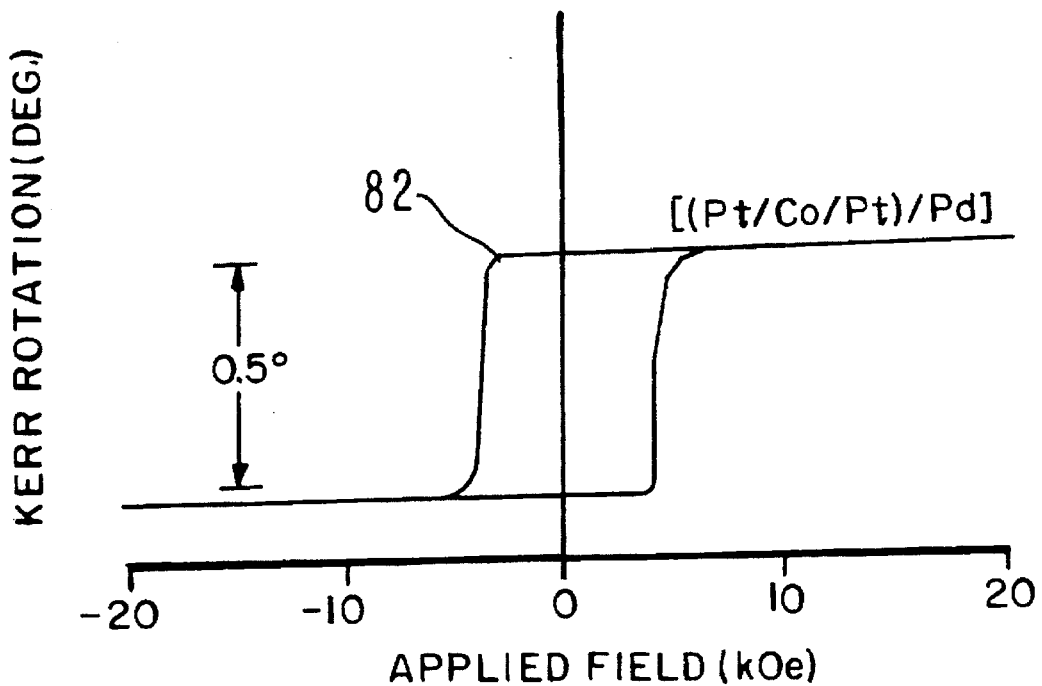
FIGS. 5A and 5B are Kerr rotations of multilayer thin films comprising (Pt/Co/Pt)/Pd and (Pd/Co/Pd)/Pt quadlayers, respectively, in accordance with the present invention.

Referring now to FIG. 5A, there are shown magneto-optic hysteresis loops 82, 84 reflecting the Kerr rotations for multilayer thin films 40, in which Pt and Pd are first and second metals and second and first metals, respectively. Hysteresis loop 82 for [Pt/Co/Pt/Pd] multilayer thin film 40 exhibits a Kerr rotation of about 0.25°, which is approximately equal to the Kerr rotation obtained with multilayer films 10 based on Pt/Co bilayers 12. Similarly, hysteresis loop 84 for [Pd/Co/Pd/Pt] multilayer thin film 40 exhibits a Kerr rotation of approximately 0.18°, which is approximately equal to the Kerr rotation obtained with multilayer films 20 based on Pd/Co bilayers 22. Thus, multilayer thin films 40 in accordance with the present invention preserve the Kerr rotations of their corresponding Pt/Co and Pd/Co multilayer thin films 10.

Figure 5B:
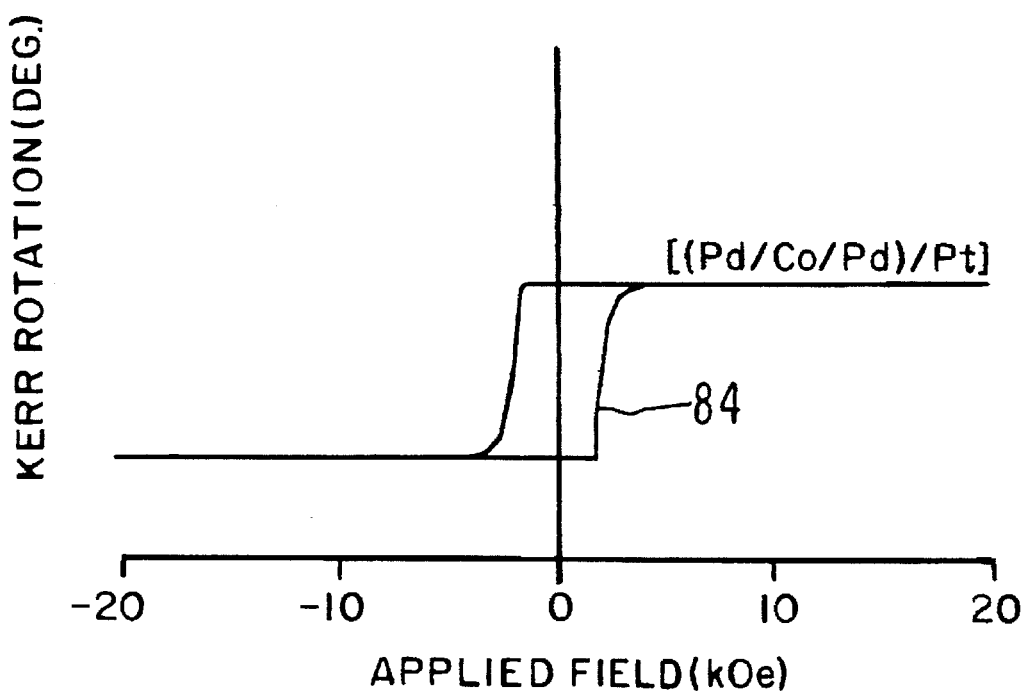
Figure 5C:
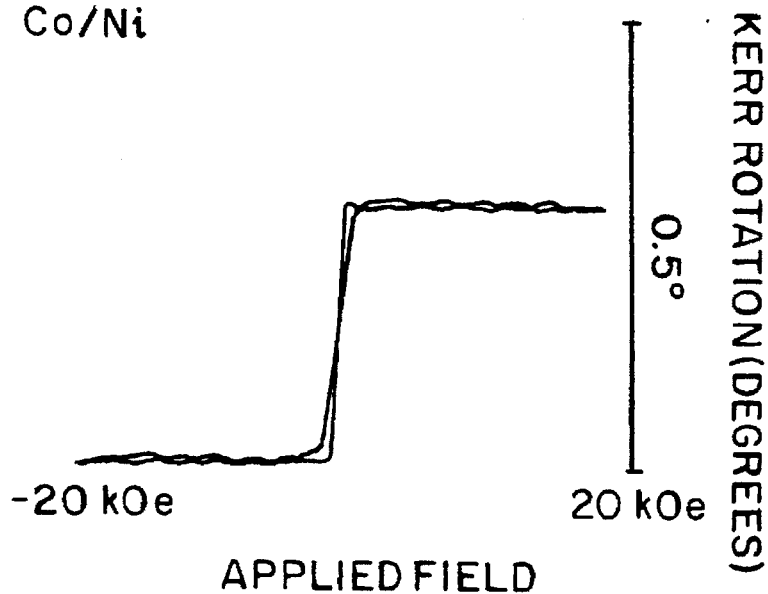
FIGS. 5C–5D show Kerr rotations for [Co/Ni], [(Pt/Co/Pt)/Ni], [Co/Cu], and [(Pt/Co/Pt)/Cu] multilayer thin films where the Pt layers thickness is of one atomic monolayer.

Referring now to FIGS. 5B and 5C, there are shown magneto optic hysteresis loops 81, 83 for a [Co/Ni] multilayer thin film 10 and a [(Pt/Co/Pt)/Ni] multilayer thin film 40. [Co/Ni] multilayer thin film 10 displays a Kerr rotation of approximately 0.15° and a magnetic coercivity that is barely detectable. [(Pt/Co/Pt)/Ni] multilayer thin film 40 displays a Kerr rotation that exceeds 0.2° and a magnetic coercivity that is approximately 1.5 kOe. Thus, both properties are substantially improved over [Co/Ni] multilayer film 10.

Figure 5D:
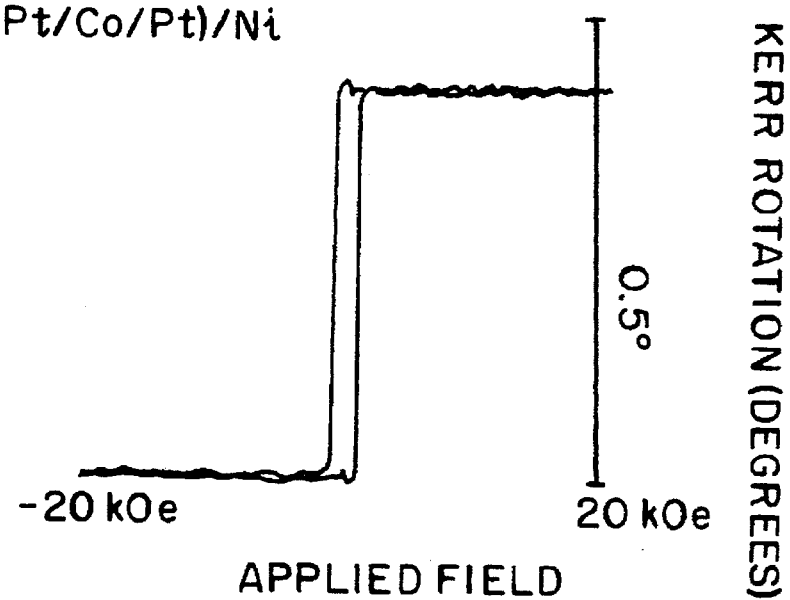

Referring now to FIGS. 5C and 5D, there are shown magneto-optic hysteresis loops for a [Co/Ni] multilayer thin film 10 and a [(Pt/Co/Pt)Ni] multilayer thin film 40, respectively, in accordance with the present invention. As can be seen in the figure, [(Pt/Co/Pt)/Ni] multilayer thin film 40 displays both a larger Kerr rotation and a larger magnetic coercivity than those of corresponding [Co/Pt] multilayer film 10.

Referring now to FIGS. 5E and 5F, there are shown magneto-optic hysteresis loops 85, 87 for a [Co/Cu] multilayer thin film 10 and a [(Pt/Co/Pt)/Cu] multilayer thin film 40 in accordance with the present invention. As above, the [(Pt/Co/Pt)/Cu] multilayer thin film 40 displays both a larger Kerr rotation and a larger magnetic coercivity than those of corresponding [Co/Cu] multilayer thin film 10. The measured $K\perp$ for [(Pt/Co/Pt)/Cu] multilayer thin film 40 (10 Merg/cc (Co)) is also approximately six times larger than the $K\perp$ for [Co/Cu] multilayer thin film 10 (1.7 Merg/cc (Co)).

Figure 6:
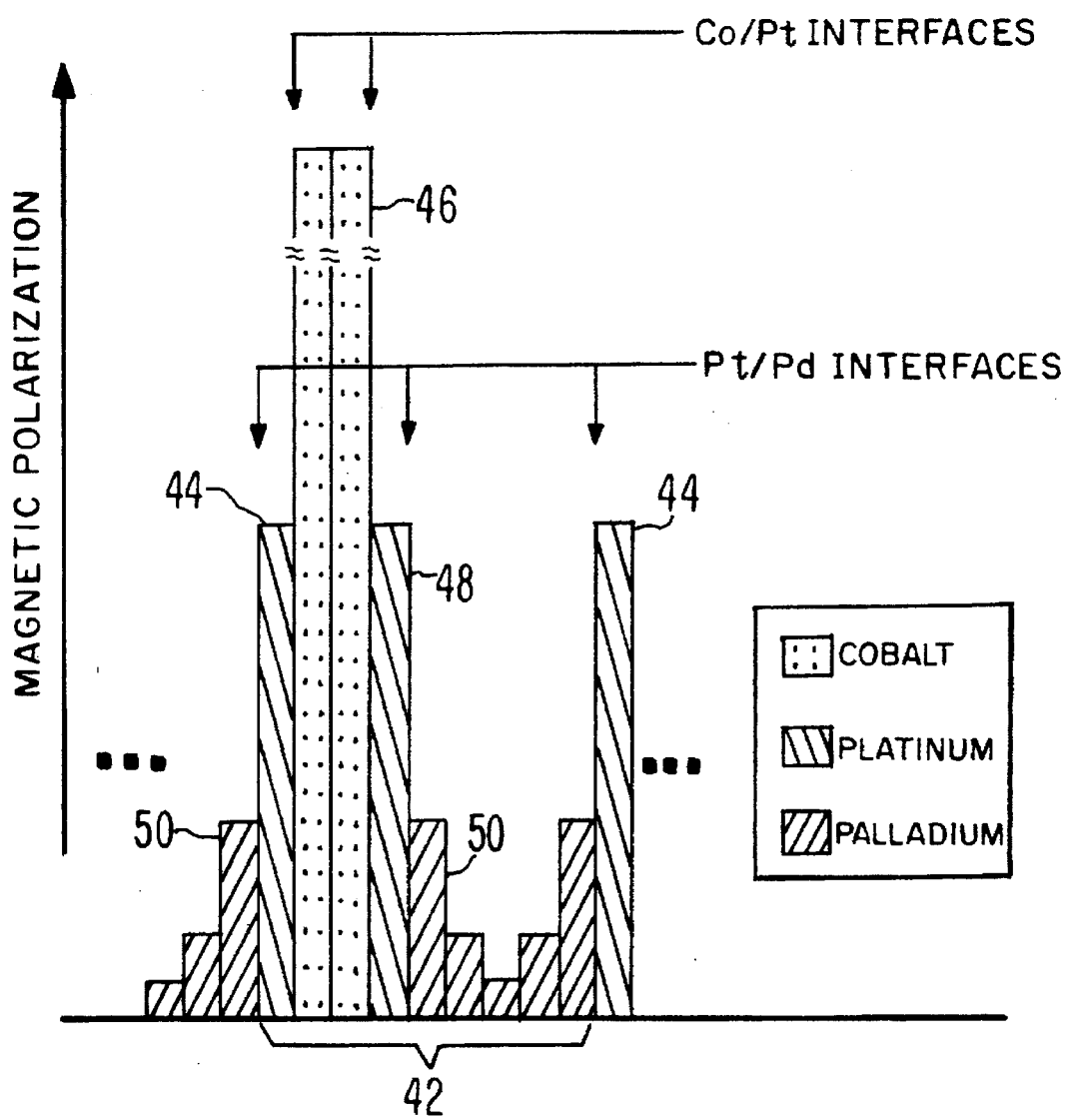
FIG. 6 is a schematic representation of the magnetic polarization of a [(Pt/Co/Pt)/Pd] multilayer thin film period in accordance with the present invention.

Referring now to FIG. 6, there is shown a schematic representation of the magnitude of the magnetic polarization for a [Pt/Co/Pt/Pd] quadlayer 42 comprising first and second Pt layers 44, 48 one atomic monolayer thick, Co layer 46 two atomic monolayers thick, and a Pd layer 50 five atomic monolayers thick. The Kerr rotations indicated in FIG. 4 for [Pt/Co/Pt/Pd] are believed to arise from the strong magnetic polarization of Pt layers 44, 48 adjacent to Co layer 44. Since this polarization decays quickly with increasing distance from Co layer 44, Pt layers 44, 48 need only be between about one atomic monolayer thick and about two atomic monolayers thick in a preferred embodiment of the invention.

Figure 7A:
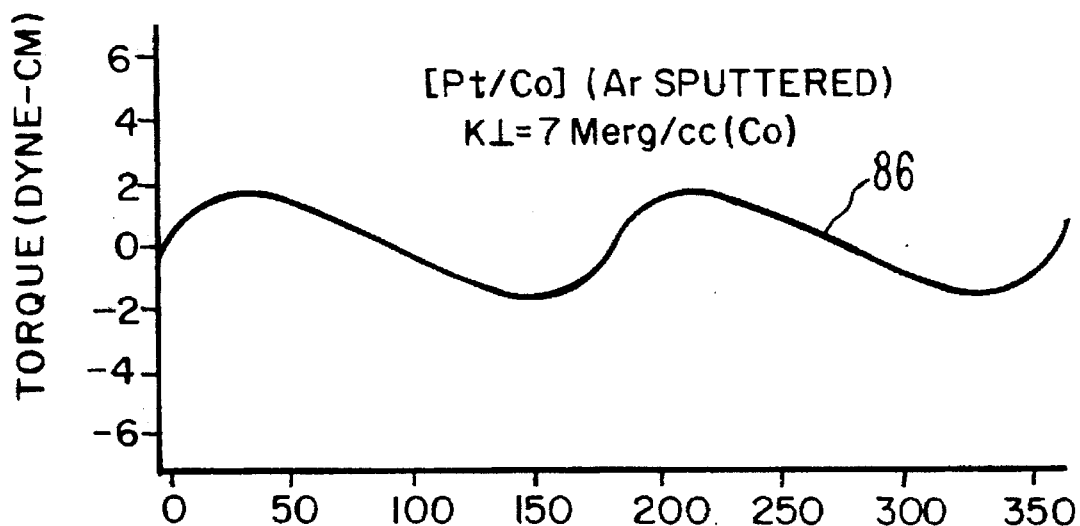
FIGS. 7A and 7B are plots of the perpendicular anisotropy of conventional Pt/Co multilayer thin films and [(Pt/Co/Pt) /Pd] multilayer thin films, respectively, each of which is formed by Ar sputtering.
Figure 7B:
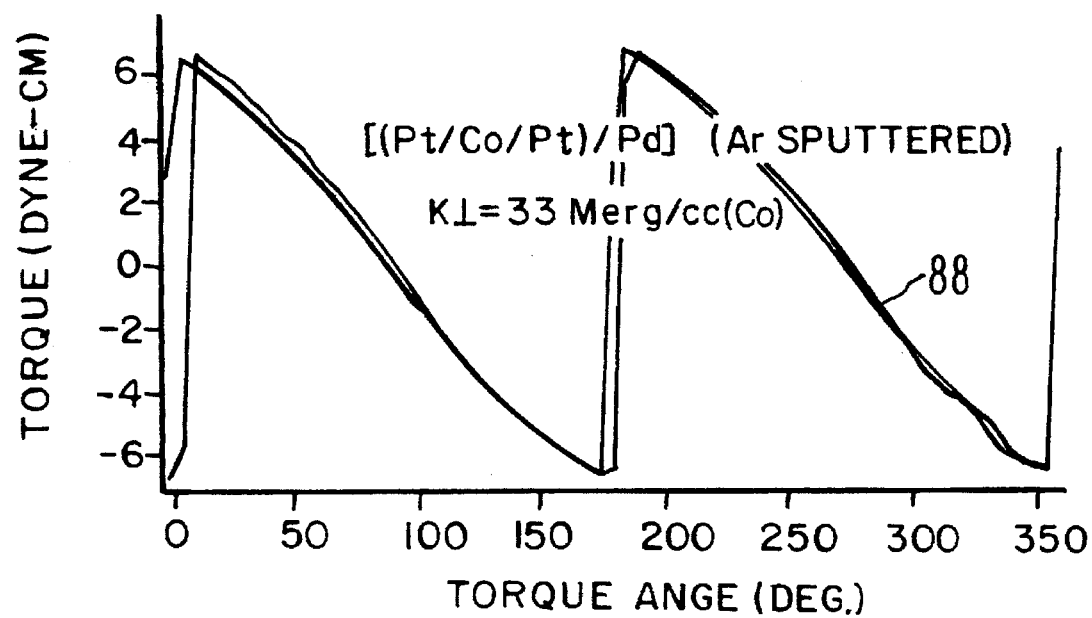

One of the principal advantages of multilayer thin films 40 over the conventional Pt/Co and Pd/Co multilayer thin films 10 is that the quadruple layer structure of quadlayers 42 enhances the perpendicular anisotropy of corresponding [Pt/Co/Pt/Pd] multilayer thin films 40 and [Pd/Co/Pd/Pt] multilayer thin films 40, respectively, by adding two first metal/second metal interfaces 47, 49 to every quadlayer 42 in an area of relatively high magnetization. The enhanced perpendicular anisotropy is evident in FIGS. 7A and 7B, which show curves 86, 88 representing the torque exerted by multilayer thin film 10 and multilayer thin film 40, respectively, in response to a magnetic field as a function of angle with respect to the thin film. Multilayer thin films 10, 40 are both produced by Ar sputtering. For [(Pt/Co/Pt)/Pd] multilayer thin film 40, curve 86 displays a maximum torque which is about three to four times that shown in curve 88 for Pt/Co multilayer thin film 10. The corresponding perpendicular anisotropies ($K\perp$) determined from torque curves 86, 88 for Pt/Co multilayer thin films 10 and [(Pt/Co/Pt)/Pd] multilayer thin films 40 are 7 Mergs/cc(Co) and 33 Mergs/cc(Co), respectively, demonstrating the enhancement of $K\perp$ provided by the structure of quadlayers 42.

Figure 8:
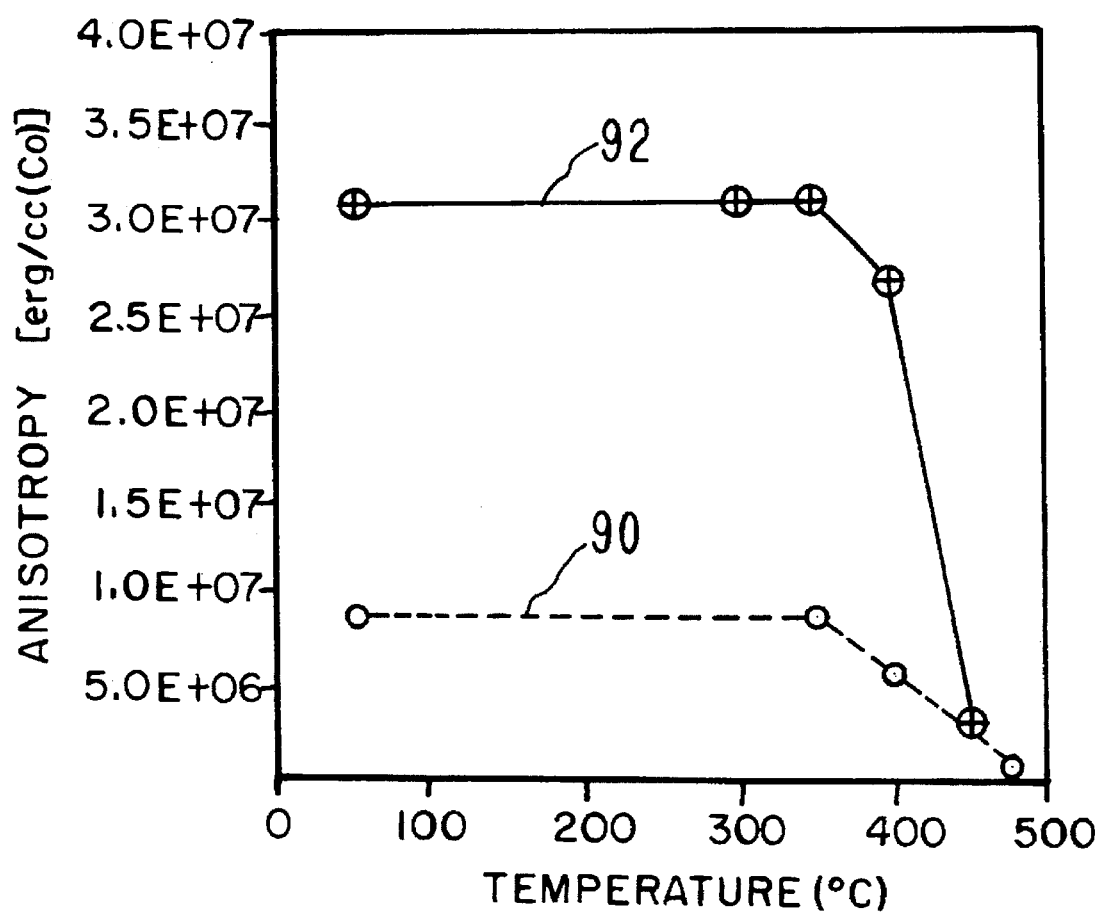
FIG. 8 is a comparison of the perpendicular anisotropy versus temperature for a multilayer thin film comprising (Pt/Co/Pt)/Pd quadlayers and a conventional multilayer thin film comprising Pt/Co bilayers made by Ar-sputtering at 5 mTorr pressure.

Referring now to FIG. 8, there are shown curves 90, 92 representing $K\perp$ versus temperature for Pt/Co multilayer thin films 10 and [Pt/Co/Pt/Pd] multilayer thin films 40, respectively. Curves 90, 92 indicate that the larger $K\perp$ for [Pt/Co/Pt/Pd] multilayer thin films 40 relative to that for Pt/Co multilayer 10 is obtained without any reduction in the temperature stability of $K\perp$.

Figure 9:
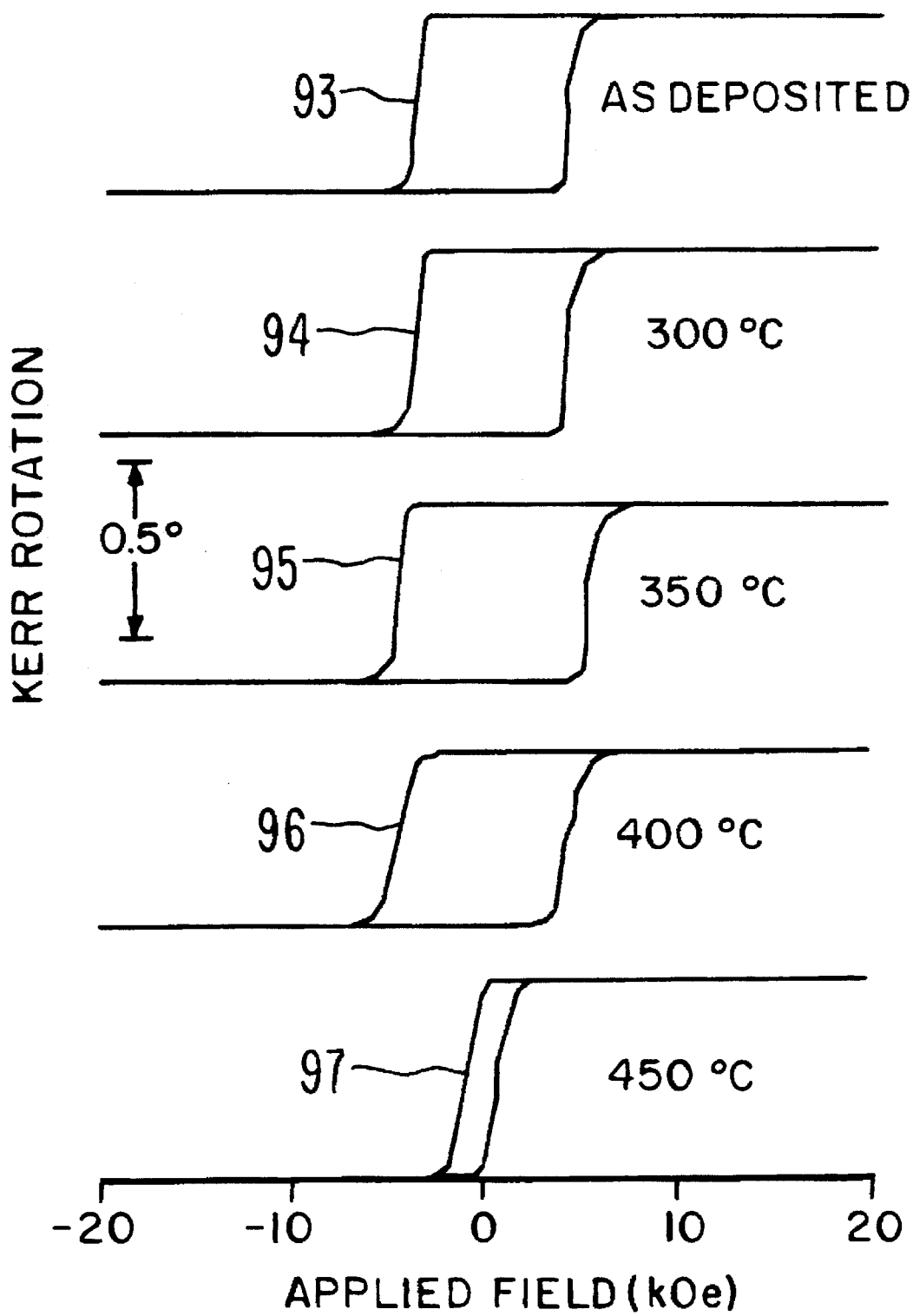
FIG. 9 is a graph of the Kerr rotations for several [(Pt/Co/Pt)/Pd] multilayer thin film samples in accordance with the present invention which have been annealed at different temperatures.

Referring now to FIG. 9, there are shown magneto-optic hysteresis loops 93–97 for [(Pt/Co/Pt)/Pd] multilayer thin films 40 that have been annealed at temperatures ranging from 300° C. to 400° C. Hysteresis loops 93–96 indicate that there is no substantial reduction in the Kerr rotations of the corresponding multilayer thin film 40 as the annealing temperature is increased. As the annealing temperature approaches 450° C., there is a marked reduction in the magnetic coercivity of [Pt/Co/Pt/Pd] multilayer thin film 40, consistent with the reduction in $K\perp$ for [Pt/Co/Pt/Pd] multilayer thin films 40 at temperatures approaching 450° C. shown in FIG. 8.

Figure 10:
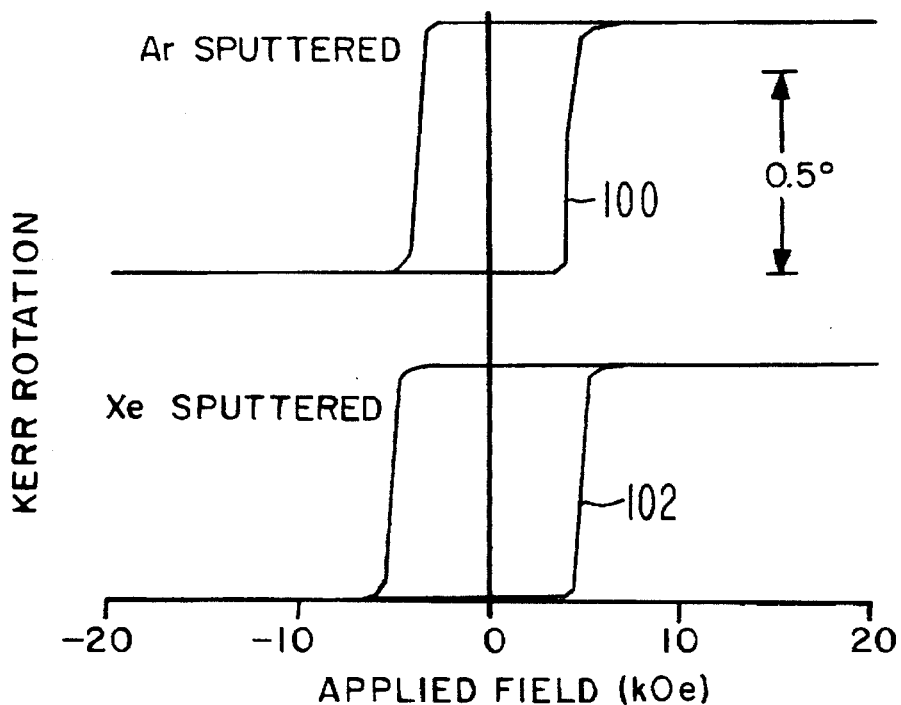
FIG. 10 is a graph of the Kerr rotations of two multilayer thin films, each including a Pt underlayer, in which the thin films are formed by Ar sputtering and Xe sputtering, respectively.

Referring now to FIG. 10, there are shown magneto-optic hysteresis loops 100, 102 for [Pt/Co/Pt/Pd] multilayer thin films 40 in accordance with the present invention wherein multilayer thin films 40 were produced by sputtering with Ar and Xe, respectively. The Kerr rotations represented by loops 100, 102 are comparable. However, the multilayer thin film 40 formed by Xe sputtering exhibits a larger magnetic coercivity than that measured for films produced by Ar sputtering. This is the same phenomenon that has been seen in Ar sputtered Pt/Co multilayer films 10 and is believed to be attributable to the greater damage done to the thin film by the energetic Ar neutrals which are backscattered into the film from the Pt target during formation of multilayer thin films 10, 40.

Referring again to FIG. 2, multilayer thin films 40 in accordance with the present invention may include underlayer 110 of thickness d inserted between substrate material 26 and the first of quadlayers 42. Inclusion of underlayer 110 wherein component layer(s) 114, 116 are selected from materials that deposit on substrate 26 as (111) crystalographically textured thin films, enhances the (111) crystallographic texture of quadlayers 42 by providing a textured substrate to bias the crystallographic orientation of deposited quadlayers 42. This provides for greater control over the grain structure of multilayer thin films 40. For example, in one embodiment of a [(Pt/Co/Pt)/Pd] multilayer thin film 40, underlayer 110 includes a first Pt underlayer 114 having a thickness x in contact with substrate material 26 and a first Pd underlayer 116 having a thickness (d−x) on top of Pt underlayer 114.

Figure 11:
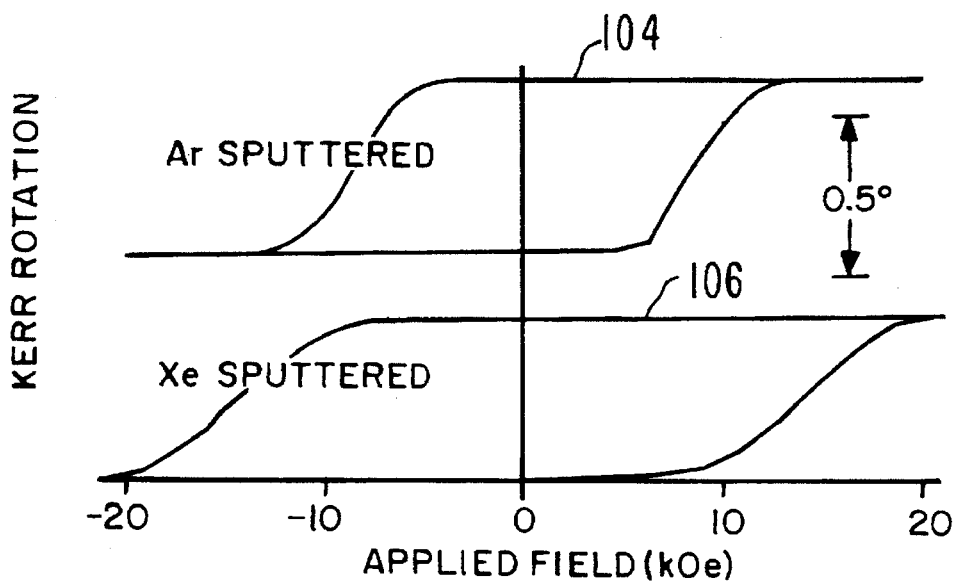
FIG. 11 shows graphs of the Kerr rotations for two [(Pt/Co/Pt)/Pd] multilayer thin films, each including a Pt/Pd underlayer, in which the thin films are formed by Ar and Xe sputtering, respectively.

Referring now to FIG. 11, there are shown magneto optic hysteresis loops 104, 106 for [(2.26ÅPt/3.2ÅCo/2.26ÅPt)/9.4ÅPd]$_{12}$ multilayer thin films 40 formed by Ar and Xe sputtering, respectively. Each multilayer thin film 40 includes an underlayer 110 comprising 60Å Pt underlayer 114 and 30 Å Pd underlayer 116. Comparison of hysteresis loops 104, 106 of FIG. 11 with hysteresis loops 100, 102 of FIG. 10 which includes only a Pt underlayer 114 indicates the enhanced magnetic coercivity produced by underlayer 110 comprising a Pt underlayer 114 and a Pd underlayer 116. Further, the Kerr rotations of multilayer thin films 40 are undiminished by additional underlayer 116 relative to those shown in FIG. 10.

Figure 12A:
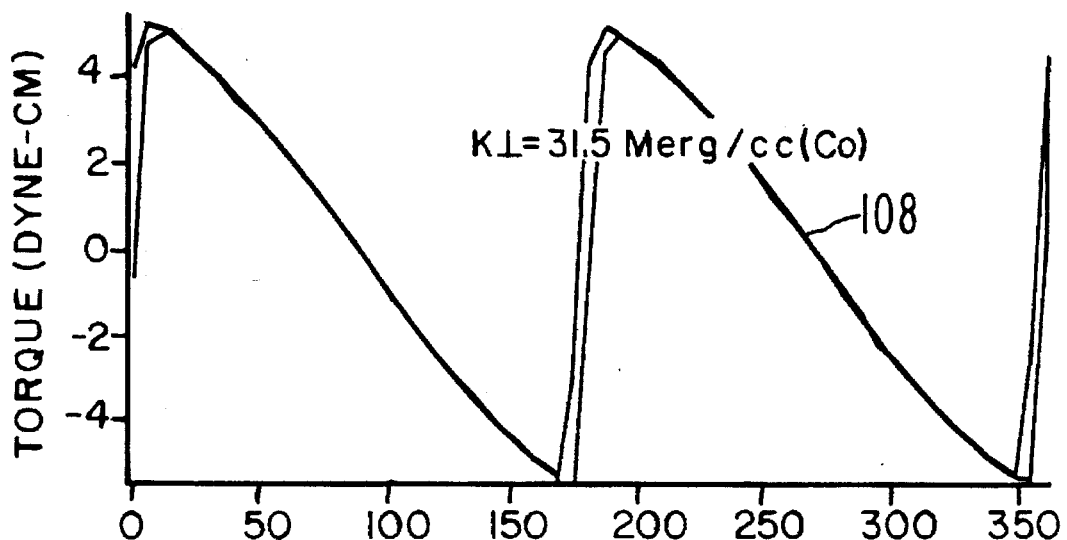
FIGS. 12A and 12B are graphs of the perpendicular anisotropy energy for [(Pt/Co/Pt)/Pd] multilayer thin films formed by Ar and Xe sputtering, respectively.
Figure 12B:
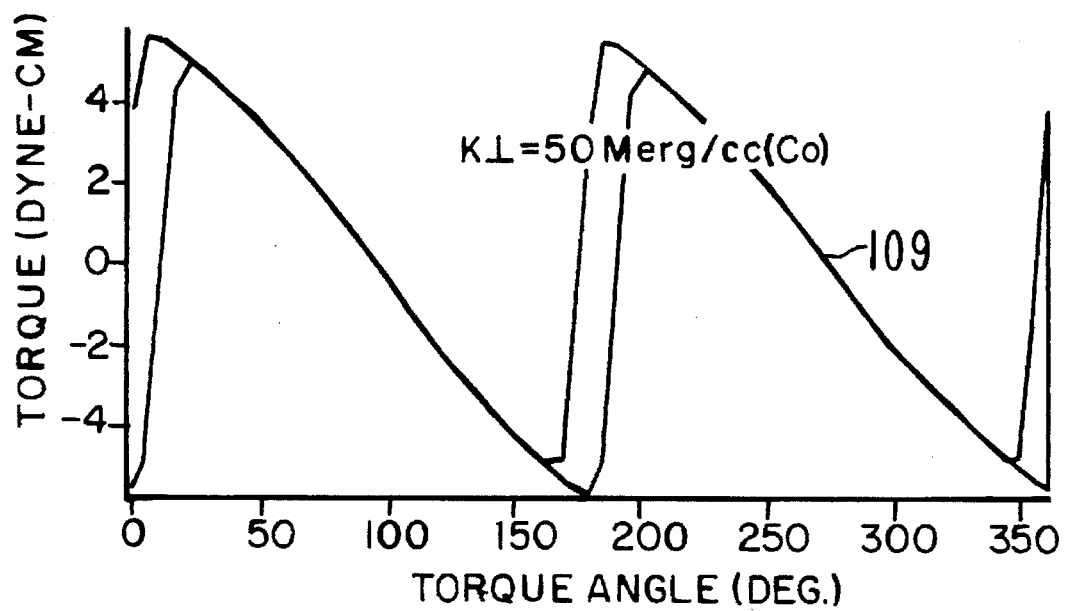

Referring now to FIGS. 12A and 12B, there are shown curves 108, 109 representing the torque of [(Pt/Co/Pt)/Pd] multilayer thin films 40 including underlayers 114, 116 produced by Ar and Xe sputtering, respectively. For Ar sputtered [(Pt/Co/Pt)/Pd] multilayer thin film 40, curve 108 yields a value of K⊥ of 31.5 Merg/cc (Co), while curve 109 yields a value of K⊥ of 50 Merg/cc (Co) for Xe sputtered [(Pt/Co/Pt)/Pd] multilayer thin film 40.

Multilayer thin films 40 may be employed in perpendicular magnetic recording applications as well as in the magneto-optic recording applications described above. Generally, perpendicular magnetic recording requires magnetic media having large magnetic moments. However, the tendency of magnetic moments to align themselves in the plane of the thin film increases with the square of the magnetic moment. Thus, increasing the magnetic moments of the bits which make up the recording medium by, for example, increasing the thickness of magnetic material layer 46 leads to substantial reductions in the K⊥s and $H_c$s of the medium. In the case of Pt/Co and Pd/Co multilayer thin films 10, respectively, which begin with small K⊥s and $H_c$s, the resulting further reduction in K⊥ and $H_c$ makes these materials unattractive for magnetic recording. This is particularly true for multilayer thin films 10 produced by Ar sputtering for which K⊥ and $H_c$ are smaller still. On the other hand, the large K⊥s and $H_c$s obtainable with for example, [(Pt/Co/Pt)/Pd] multilayer thin films 40 means that reductions in K⊥s and $H_c$s that accompany increases in the thickness of Co layers 46 will not preclude their use as magnetic recording media.

Figure 13:
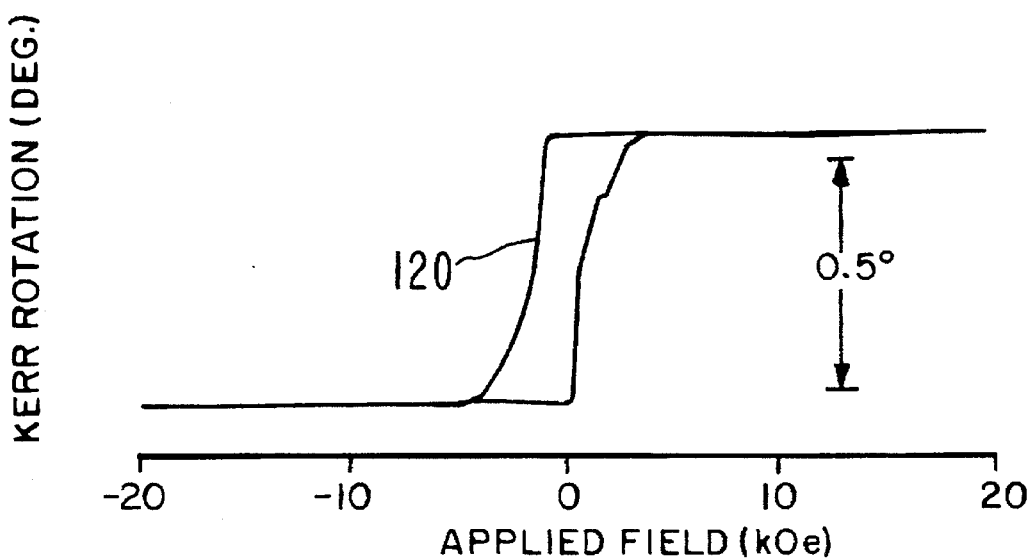
FIG. 13 is a graph of the Kerr rotation of a [(Pt/Co/Pt)/Pd] multilayer thin film in accordance with the present invention in which the thickness of the Co layer has been increased to enhance the magnitude of the total magnetic moment.

Referring now to FIG. 13, there is shown hysteresis loop 120 for [Pt/Co/Pt/Pd] multilayer thin film 40 in accordance with the present invention in which Y, the thickness of Co layer 46, of each quadlayer 42 is 8.14Å. The reduction in $H_c$ is clear when hysteresis loop 120 is compared with curve 82 of FIG. 5A. However, by including an underlayer 110 in [Pt/Co/Pt/Pd] multilayer thin film 40, $H_c$ may be increased to levels more attractive for perpendicular magnetic recording.

Multilayer thin film 40 may comprise quadlayers 42 of the form [Pt/Co/Pt/Q] where Q≠Pd, as was already exemplified in FIG. 5. These alternative structures may be used to provide substantial Kerr rotations and enhanced K⊥s and $H_c$s in addition to providing other desirable properties over the corresponding Co/Q multilayers. Suitable metals Q for producing multilayer thin films 130 are those that preserve the overall (111) texture of the Pt/Co/Pt layers 44, 46, 48, respectively, and allow for exchange coupling with the magnetic layer 46. Examples of such metals are Ag, Au, Cu, Ir, Rh, and Ni.

Figure 14:
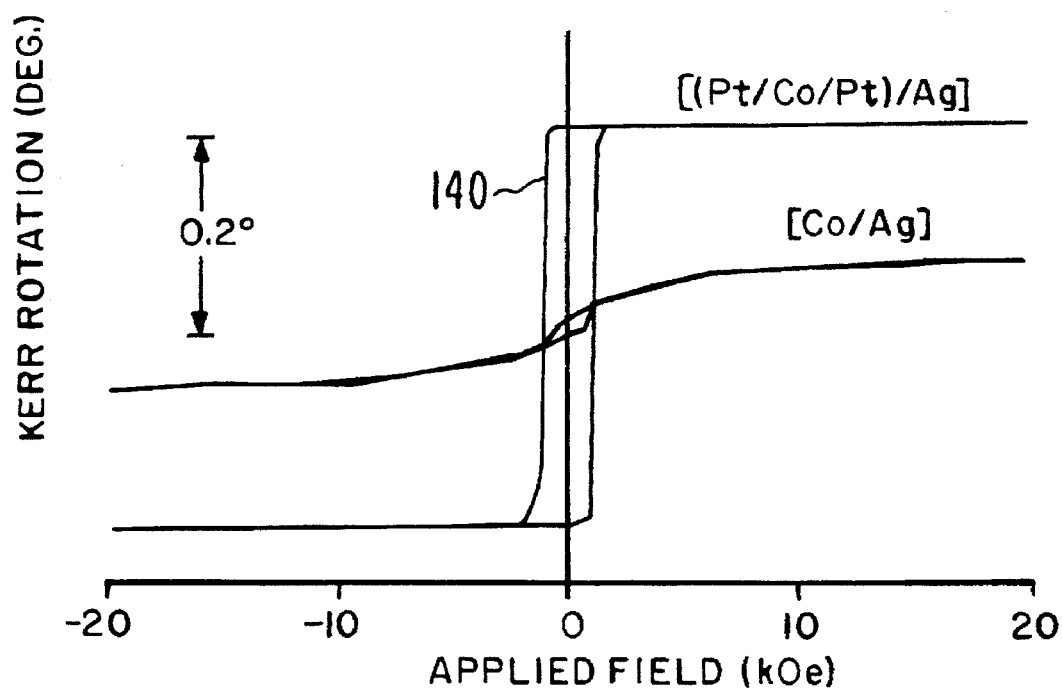
FIG. 14 is a graph of a [(Pt/Co/Pt)/Ag] multilayer thin film in accordance with the present invention.

Referring to FIG. 14, there is shown a hysteresis loop 140 for a [(Pt/Co/Pt)/Q] multilayer thin film 40 in accordance with the present invention in which Q=Ag. For comparison, there is also shown a hysteresis loop 142 for a multilayer thin film based on [Co/Ag] bilayers. The Kerr rotation of [(Pt/Co/Pt)/Ag] multilayer thin film 40 is comparable to that of [(Pt/Co/Pt)/Pd] multilayer thin films 40 and the K⊥ and $H_c$ of the multilayer thin film 40 may be enhanced by the addition of underlayer 110 in accordance with the present invention. In addition to Ag, it is anticipated that Q may be a refractory metal such as Ta, Nb, and W, for example, which may impart higher thermal stability to [(Pt/Co/P t)/Q] multilayer thin films 40 in accordance with the present invention. Further, the Kerr rotation of [(Pt/Co/Pt)/Q] multilayer thin films 40 may be enhanced by allowing Q to be a weak light-scattering material such as a non-metal, which preserves the (111) structure of the [Pt/Co/Pt] layers 44, 46, 48. In this case, the Kerr rotation would be enhanced by a non-metallic Q since the light would traverse through more polarized Pt layers 44, 48 on its scattering trajectory.

We claim:

1. A magnetic multilayer thin film having perpendicular anisotropy, the magnetic multilayer thin film comprising:

a substrate having a first surface; and formed on the first surface of the substrate, a plurality of quadlayers forming a periodic array in a direction normal to the first surface of the substrate, with each quadlayer comprising:

a first layer of a first metal selected from the group comprising Pt, Pd, Ir, Rh, Au, Cu, Ag, and Ni and having a thickness of between approximately one monolayer and two monolayers;

formed on the first layer, a layer of a magnetic material selected from the group comprising Co, Ni, and Fe and having a selected thickness;

formed on the layer of magnetic material, a second layer of the first metal having a thickness of between approximately one monolayer and two monolayers; and formed on the second layer of the first metal, a layer of a second metal that is different from the first metal and the magnetic material and that is selected from the group comprising Pt, Pd, Ir, Rh, Cu, Au, Ag, Ni, and Mn, the layer of the second metal having a selected thickness.

2. A multilayer thin film in accordance with claim 1, wherein the second metal is selected from the group comprising Pt, Pd, Ag, Au, Cu, Rh, Ir, Ni, and Mn.

3. A multilayer thin film in accordance with claim 1, wherein the magnetic material is selected from the group comprising Fe, Co, and Ni.

4. A multilayer thin film in accordance with claim 1, wherein the first and second layers of the first metal of each quadlayer have substantially equal thicknesses.

5. A multilayer thin film in accordance with claim 4, wherein the thickness of the layer of magnetic material is between about one atomic monolayer and about five atomic monolayers.

6. A multilayer thin film in accordance with claim 5, wherein the first metal is Pt, the second metal is Pd, and the magnetic material is Co.

7. A multilayer thin film in accordance with claim 5, wherein the first metal is Pd, the second metal is Pt, and the magnetic material is Co.

8. A multilayer thin film in accordance with claim 1, wherein the quadlayers have a (111) crystallographic texture in the plane of the multilayer thin film.

9. A multilayer thin film in accordance with claim 8, further including an underlayer between the substrate and the first of the quadlayers for enhancing the (111) crystallographic texture of quadlayers forming the multilayer thin film and promoting large magnetic coercivities.

10. A multilayer thin film in accordance with claim 9, wherein the underlayer comprises at least one underlayer of a material which forms thin films having a (111) crystallographic texture.

11. A multilayer thin film in accordance with claim 10, wherein the underlayer comprises an underlayer of a metal selected from the group comprising Pd, Pt, Ag.

12. A multilayer thin film in accordance with claim 10, wherein the underlayer comprises:

an underlayer of a first underlayer metal a selected thickness; and an underlayer of a second underlayer metal, different from the first underlayer metal and having a selected thickness.

13. A multilayer thin film in accordance with claim 12, wherein the first and second underlayer metals are selected from the group comprising Pt, Pd, Ag.

14. A method for producing a magnetic multilayer thin film material having high perpendicular anisotropy and magnetic coercivity, the method comprising the steps of:

depositing a first layer of a first metal selected from the group comprising Pt, Pd, Ir, Rh, Au, Cu, Ag, and Ni to a thickness of between approximately one monolayer and two monolayers onto a substrate;

depositing a layer of a magnetic material selected from the group comprising Co, Ni, and Fe to a selected thickness onto the first layer of the first metal;

depositing a second layer of the first metal to a thickness of between approximately one monolayer and two monolayers onto the layer of magnetic material;

depositing a layer of a second metal that is selected from the group comprising Pt, Pd, Ir, Rh, Cu, Au, Ag, Ni, and Mn and that is different from the first metal to a selected thickness onto the second layer of the first metal to form a deposited quadlayer; and repeating the deposition of a first layer of the first metal, a layer of magmatic material, a second layer of the first metal, and a layer of second metal on the previously deposited quadlayer a selected number of times to form a multilayer thin film.

15. The method of claim 14, wherein the selected thicknesses of the first and second layers of the first metal are substantially equal for each quadlayer of the multilayer thin film.

16. The method of claim 15, wherein the selected thickness of the first layer of the second metal is at least as large as the selected thickness of one of the layers of the first metal for each quadlayer of the multilayer thin film.

17. The method of claim 14, wherein the second metal is selected from the group comprising Pt, Pd, Ag, Au, Cu, Ir, Rh, Mn, and Ni.

18. The method of claim 14, wherein the magnetic material is selected from the group comprising Fe, Co, and Ni.

19. A method of claim 14, wherein the step of depositing a first layer of a first metal to a thickness of between approximately one monolayer and two monolayers onto a substrate comprises the substeps of:

depositing an underlayer onto the substrate; and depositing the first layer of the first metal to a thickness of between approximately one monolayer and two monolayers onto the underlayer.

20. The method of claim 19, wherein the step of depositing an underlayer onto the substrate comprises the substeps of:

depositing a first underlayer of a first underlayer material onto the substrate; and depositing a second underlayer of a second underlayer material that is different from the first underlayer material onto the first underlayer.

21. The method of claim 20, wherein the substeps of depositing first and second underlayers comprises depositing first and second underlayers that form thin films having selected crystallographic textures.

22. The method of claim 21, wherein the first and second underlayer materials are selected from the group comprising Pd, Pt, Ag.

* * * * *